United States Patent [19]
Kolb

[11] Patent Number: 5,613,093
[45] Date of Patent: Mar. 18, 1997

[54] APPARATUS AND METHOD FOR DRILL DESIGN

[76] Inventor: George P. Kolb, 3311 Teasley La., Denton, Tex. 76205

[21] Appl. No.: 321,914

[22] Filed: Oct. 12, 1994

[51] Int. Cl.$^6$ ........................................................ G06F 19/00
[52] U.S. Cl. .......................... 395/500; 395/512; 395/173; 345/122
[58] Field of Search .................................. 395/500, 152, 395/155, 161, 128, 140, 141, 142, 143, 147; 345/122, 145; 352/87

[56] References Cited

U.S. PATENT DOCUMENTS

| | | | |
|---|---|---|---|
| 4,813,013 | 3/1989 | Duun | 364/900 |
| 4,952,051 | 8/1990 | Lovell et al. | 352/87 |
| 5,214,758 | 5/1993 | Ohda et al. | 395/164 |
| 5,262,765 | 11/1993 | Tsumura et al. | 345/122 |
| 5,317,681 | 5/1994 | Glassner | 395/141 |
| 5,325,475 | 6/1994 | Poggio et al. | 395/133 |
| 5,384,908 | 1/1995 | Mackinlay et al. | 395/152 |
| 5,416,899 | 5/1995 | Poggio et al. | 395/152 |
| 5,425,109 | 6/1995 | Saga et al. | 382/187 |
| 5,448,694 | 9/1995 | Wada et al. | 395/152 |

OTHER PUBLICATIONS

Silicon Beach Software, Inc., "Aldus Superpaint Manual", 1991, pp. 4–139.

*Primary Examiner*—Kevin J. Teska
*Assistant Examiner*—Tan Nguyen
*Attorney, Agent, or Firm*—Theodore F. Shiells

[57] ABSTRACT

A drill design aide for designing a drill having a plurality of positions wherein a user is able to access the drill design aide through a graphical interface which displays a drill being designed. A drawing module within the drill design aide enables a user to create and edit the drill being displayed upon the graphical interface. A count track module enables a user to create an initial formation and reshape the initial formation to a next formation without a user completely redrawing the next formation. A drill resize module enables a user to resize a previously designed drill having a first number of positions to a new drill having a different number of positions than the originally designed drill by either increasing or decreasing the number of positions within the drill.

8 Claims, 8 Drawing Sheets

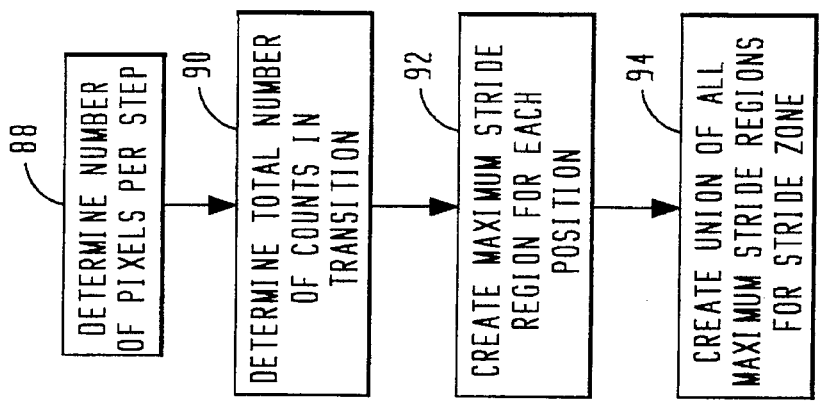
FIG. 7
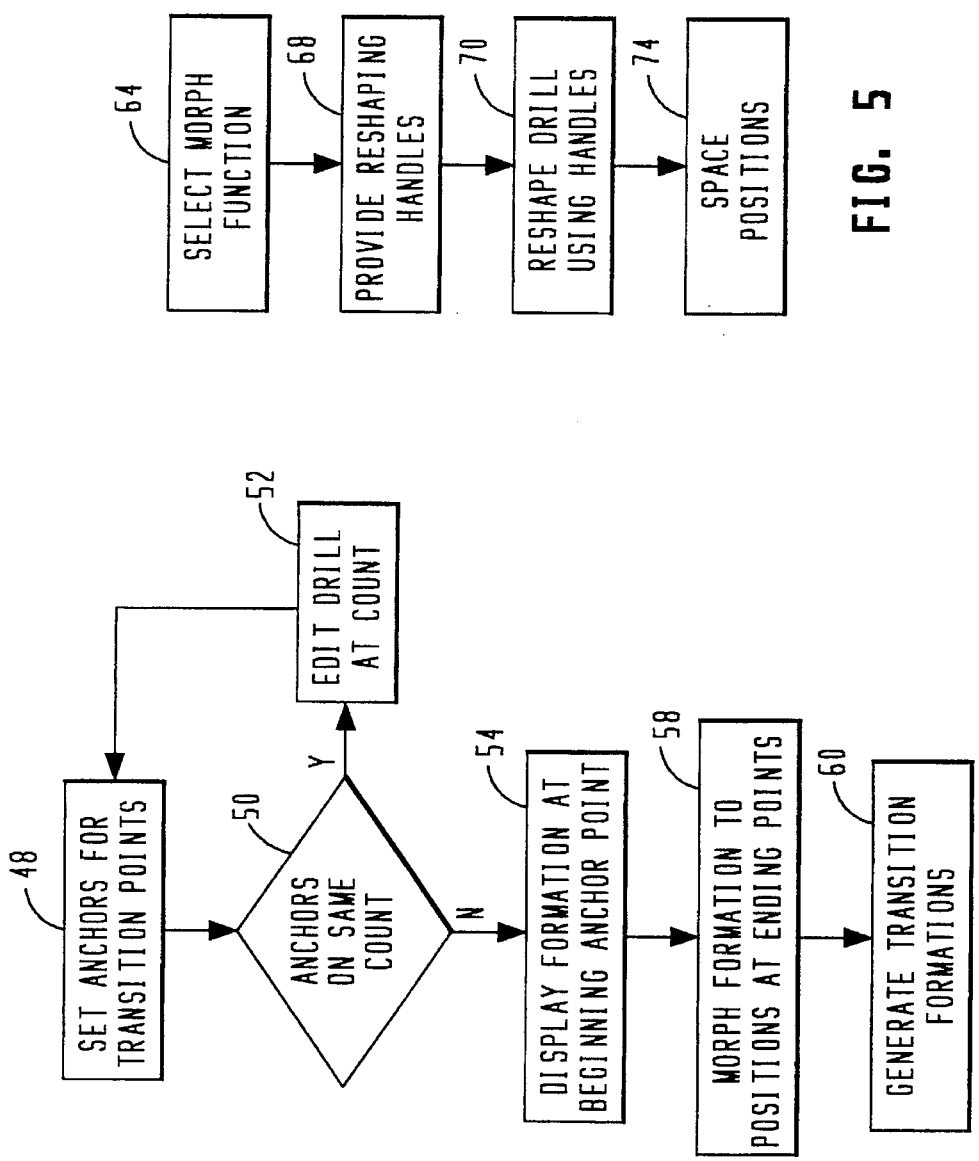
FIG. 5
FIG. 3

APPARATUS AND METHOD FOR DRILL DESIGN

TECHNICAL FIELD

The present invention relates to drill design aides, and more particularly to a graphically driven drill design aide.

BACKGROUND OF THE INVENTION

The large field productions put on every year during half-time and pre-game performances of professional, college and high school games require a great deal of planning and design. Perhaps the greatest amount of time involved in organizing these events is the planning and design of the performance drills. The placement and movement of the individuals comprising the organizations performing a drill is a time consuming and complex procedure.

There presently exists a number of products for assisting individuals in drill design. The most widely used of these products comprise computerized drill design aides allowing a drill to be created by computer. However, presently existing computerized drill design aides suffer from a variety of drawbacks that increase the time and effort required to design a drill. First, most presently existing computerized drill design aides require a user to generate from scratch a drill formation at each transition point within a drill. A transition point comprises a starting or ending point where one drill formation transitions to another. For example, to illustrate a square formation transitioning to a circle formation, a user would have to draw the square at the initial transition point and then the circle at the ending transition point. This of course requires a great deal of time and effort on the part of the drill designer for more complex drills formations.

Presently existing computerized drill design aides also lack the ability to provide automatic animation. In order for a user to illustrate a point between two transition points, the various points between the transition points have to be manually created in order to demonstrate the animation flow between the transition points. This limitation increases the time required to design a drill and limits the number of points a user is able to illustrate within the drill. Finally, presently existing computerized drill design aides only allow a particular drill design to be used with a specific number of individuals. If the number of individuals involved within the drill should increase or decrease, the drill becomes useless because the computerized drill design aide does not allow for resizing the drill to accommodate a differing number of individuals.

Therefore, a need has arisen for a computerized drill design aide that enables a user to more quickly and efficiently design a drill, provides automatic automation functionalities and provides various functionalities to ease the design and redesign of drills in a manner superior to presently existing systems.

SUMMARY OF THE INVENTION

The present invention overcomes the foregoing and other problems with a new and improved computerized drill design aide. The present invention includes a graphical interface wherein a user may generate a display of a drill that is presently being designed. The graphical interface also provides a user access to a plurality of modules enabling the design of a performance drill. A drawing tool module enables creation and editing of any drill displayed upon the graphical interface. A count track module allows an initially created drill formation to be reshaped to a new formation without requiring the complete regeneration of the new drill formation. The count track module also automatically generates the location of each position within a formation between the initial and new formations. Functionalities within the count track module include a morph function for reshaping the initially generated formation and a stride zone function for determining the maximum area within which a formation may move.

A drill rewrite module allows the number of positions to be altered within a previously designed drill. Using either a delete position function or an add position function, the number of positions within a drill may be decreased or increased as desired. An editing layer module enables a user to edit a drill formation displayed by the graphical interface at a variety of levels depending upon the present needs of the user. A MIDI module enables the input and play of a MIDI file concurrently with the execution of a designed drill program. Finally, a triplicate mirror module provides multiple duplicates of a drill formation from a selected vantage point.

BRIEF DESCRIPTION OF THE DRAWINGS

For a more complete understanding of the present invention and the advantages thereof, reference is now made to the following Detailed Description taken in conjunction with the accompanying Drawings in which:

FIG. 3 is a flow diagram illustrating the operation of the count track function of the present invention;

FIG. 5 is a flow chart illustrating the operation of the morph function of the present invention;

FIG. 7 is a flow chart illustrating the operation of the stride zone function of the present invention;

DETAILED DESCRIPTION

Figure 1:
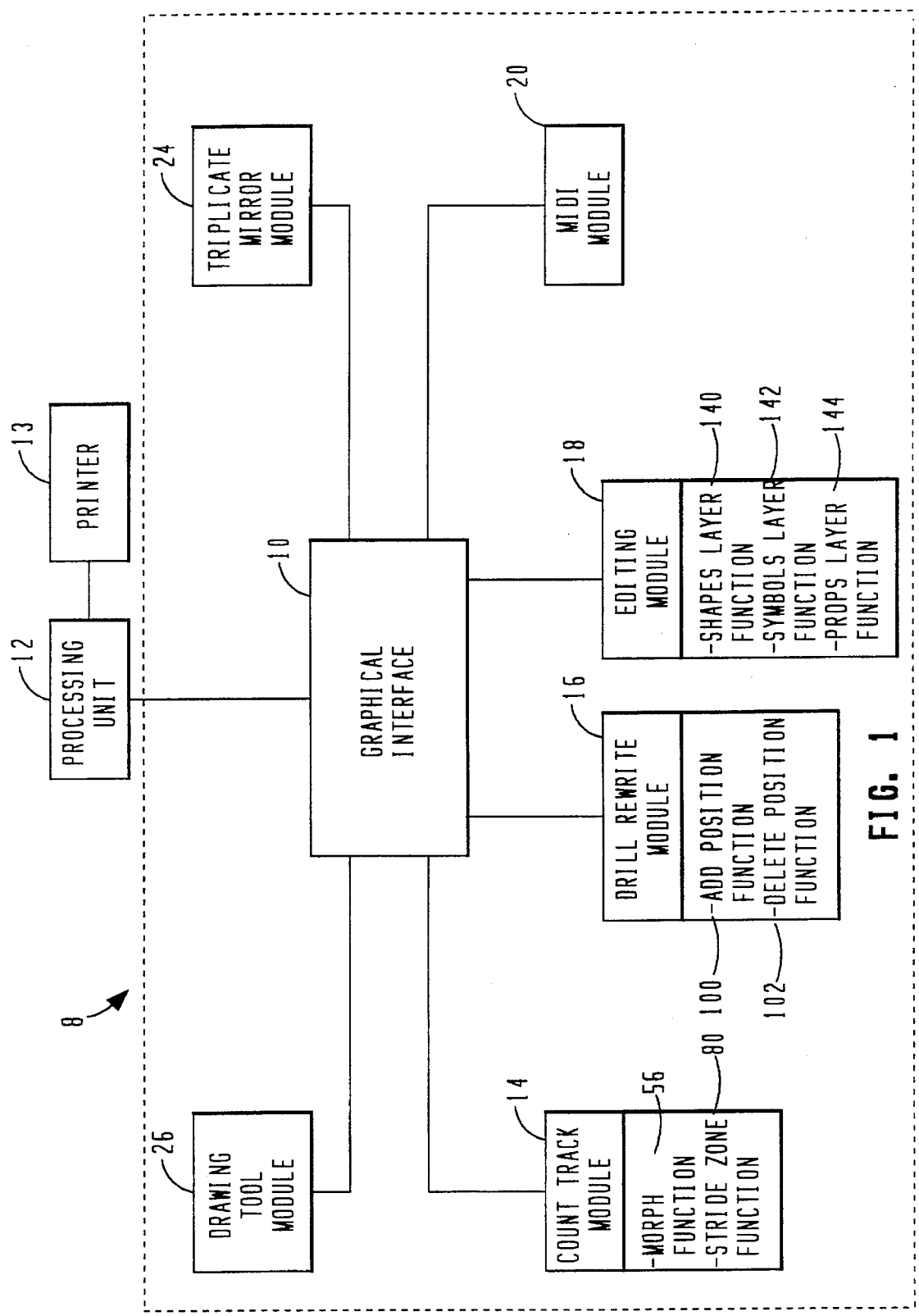
FIG. 1 is a block diagram illustrating the drill design aide of the present invention.

Referring now to the drawings, and more particularly to FIG. 1, there is illustrated the drill design aid of the present invention. The drill design aide 8 combines a graphical user interface 10 with a plurality of functional modules to assist a user in designing a drill. A user is able to interact with the drill design aide 8 through a processing unit 12. The processing unit 12 includes a keyboard display and computer processor enabling the user to use the drill design aide 8 via the graphical user interface 10. The processing unit 12 ideally comprises a personal computer such as a Macintosh, Apple or IBM personal computer. A printer 13 allows printing of the drills designed by the drill design aide 8.

Through the graphical user interface 10 displayed upon the terminal of the processing unit 12, the user is able to access the count track module 14, drill rewrite module 16, editing module 18, MIDI module 20 and triplicate mirror module 22. These modules will be more fully discussed in a moment. The drill design aide 8 further includes a drawing tool module 26 providing a user with a variety of drawing tools to create a desired drill design. The module includes basic drawing tools such as line, curve, arc, box and multi-line and further includes means for combining these drawing tools to create more complex shapes.

Figure 2:
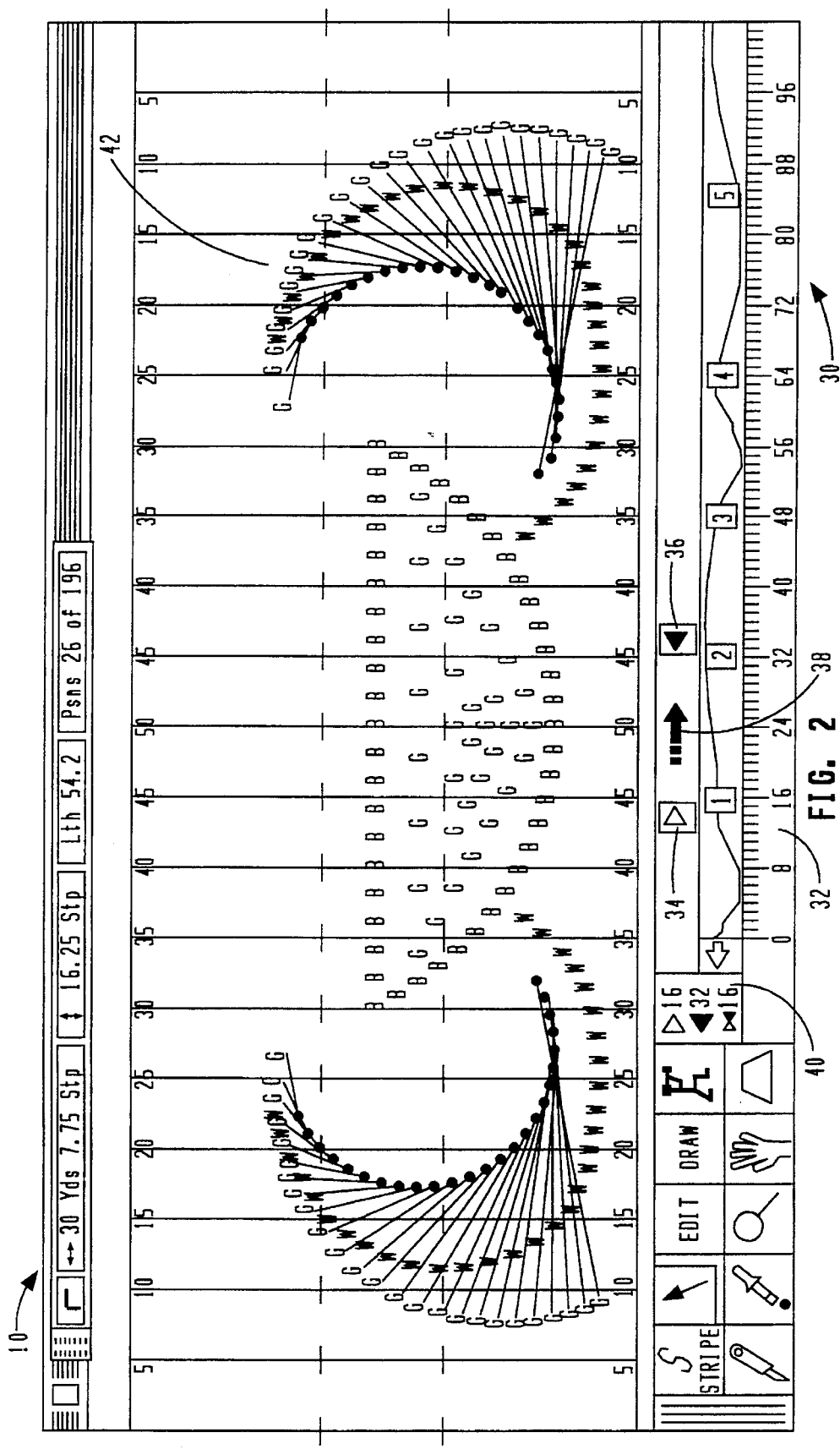
FIG. 2 illustrates the count track of the drill design aide.

Referring now to FIGS. 1 and 2, the count track module 14 of the drill design 8 will be more fully discussed. The count track module 14 is a design aid allowing a user to design a drill on a count by count basis. The count track is represented as a horizontal ruler 30 on the graphical user interface 10. The horizontal ruler 30 includes a scale 32 indicating the number of counts contained with a drill. A pair of editing anchors 34 and 36 can be moved from left to right along the scale 32. The beginning anchor 34 indicates the beginning count of a formation transition. A transition is an animated phase of movement when individuals are moving one formation to second formation. The ending anchor 36 indicates the ending count of a transition. A transition direction indicator 38 indicates the direction in which a transition is occurring and an anchor position indicator 40 indicates the locations of the beginning anchor 34, ending anchor 36 and presently displayed count location of the drill displayed on a field display 42. The field display 42 displays the position of the performers at the indicated anchor settings. For example, if the beginning position anchor 34 is placed over count 16 and ending position 36 is placed over count 48, the positions at counts 16 and 48 are displayed on the display field 42. Since two counts are normally shown at the same time, the position color, size or symbol differences may be used to indicate the difference between the starting and ending count of the transition. Alternatively, any of the formation positions between counts 16 and 48 may also be displayed.

Referring now to FIG. 3, there is a flow chart illustrating the operation of the count track module 14. A user sets at step 48 the beginning and ending anchors to desired transition points. Inquiring step 50 determines if the anchors 34 and 36 are set to the same count location. When the two editing anchors are set to the same count location, a single count of a drill is displayed within the field display 42 and can be edited at step 52 by a user without creating the animated transitions that normally occur when editing between the beginning and ending anchors 34 and 36. If the beginning and ending anchors 34 and 36 are not set to the same count location, the drill location at the beginning anchor point 34 is display at step 54. Using a morph function 56, which will be more fully discussed in a moment, the formation at the beginning anchor point is reshaped to a desired ending formation appearing at the ending anchor point. The count track module 14 then generates at a step 60 the transition formations occurring between the two anchors points when moving from the beginning formation to the ending formation. Thus, the location of each position in the formation is determined for each count between the beginning and ending transition points. This process may be repeated by moving the starting anchor to the location of the ending anchor, and the ending anchor to a new location further down the scale 30.

After a user has created the starting formation of a drill, the user only needs to morph the previously generated formation by moving the starting and ending anchors down the count track. This provides a quicker method for drill design than is possible using the conventional method of drawing a new formation at each transition location. Furthermore, the location of each position or individual in a drill is automatically calculated for each count between the beginning and ending anchor locations. Thus, the count track module 14 allows a user to generate a view of the formation on the field display 42 at any count during a drill once all transition point formations have been generated.

Figure 4A:
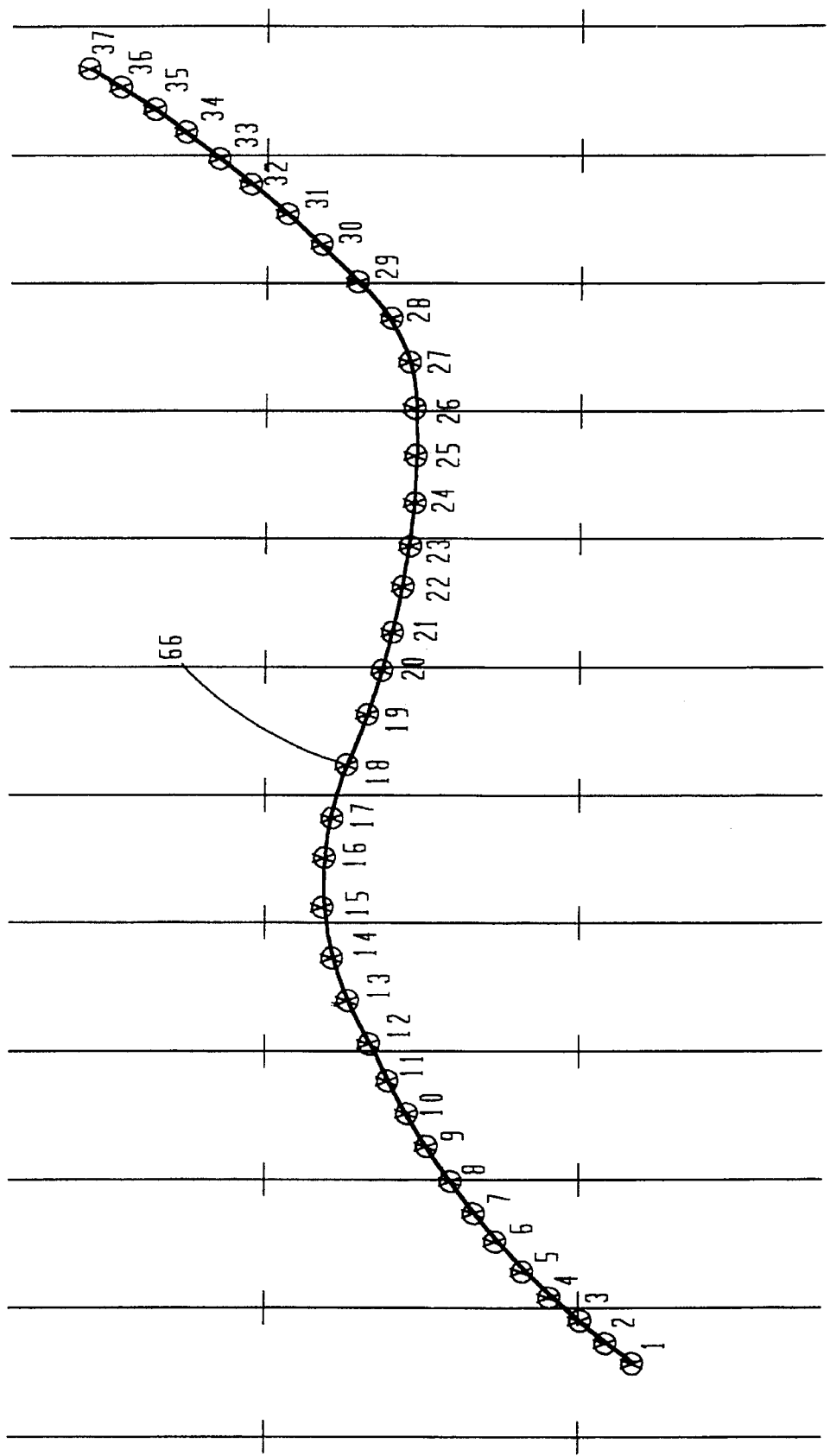
FIGS. 4A and 4B illustrate the operation of the morph function on a display field of a graphical interface.
Figure 4B:
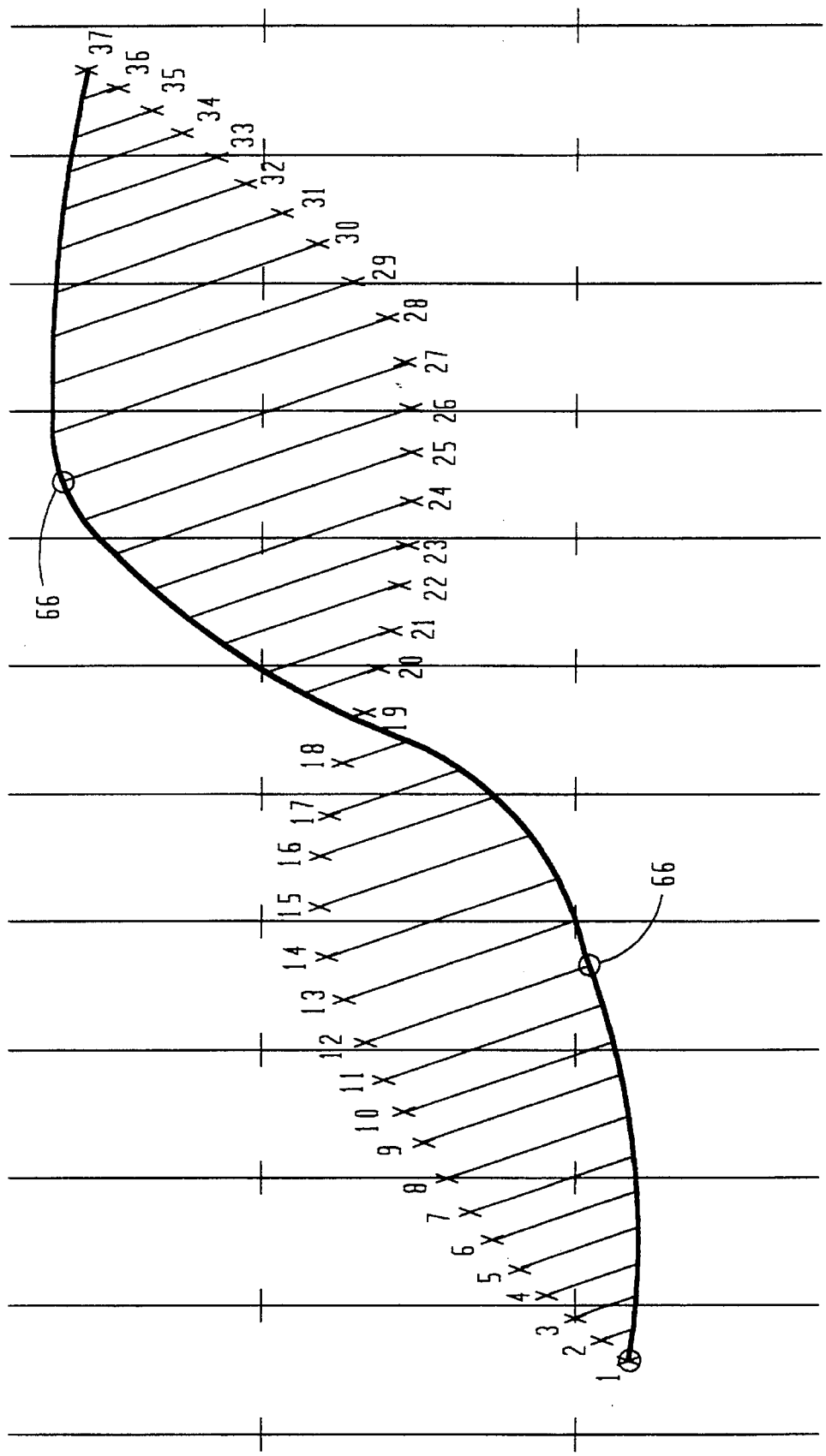

Referring now to FIGS. 1, 4A, 4B and 5, the morph function 56 provides a reshaping process by which a previously completed formation at a transition point may be reshaped into a new formation. When the morph function 56 is selected at step 64, a variety of reshaping handles 66 are provided at step 68 over each position in a shape, as shown in FIG. 4A. The reshaping handles 66 allow the user reshape the formation at step 70 and create a new ending formation as shown in FIG. 4B. The formation is reshaped using a variety of controls for a moving, adding or connecting the handles. Handles may be connected in a straight or curved manner. The handles may also be dragged to a new position on the display field 42. As the handles 66 are dragged to form a new formation, paths 72 for each position are generated between the original formation and the new formation. As the positions are moved to a new formation, the spacing of the positions is continuously adjusted and displayed at the paths between formations at step 74. The spacing is adjusted to maintain equal spacings between all positions in the formation. Once the new ending formation is created, the transitions between the original and new formations are calculated as discussed previously with respects to the count track module. Other reshaping operations are rotations (gate), translations (push), distortions and point following point (follow the leader).

Figure 6:
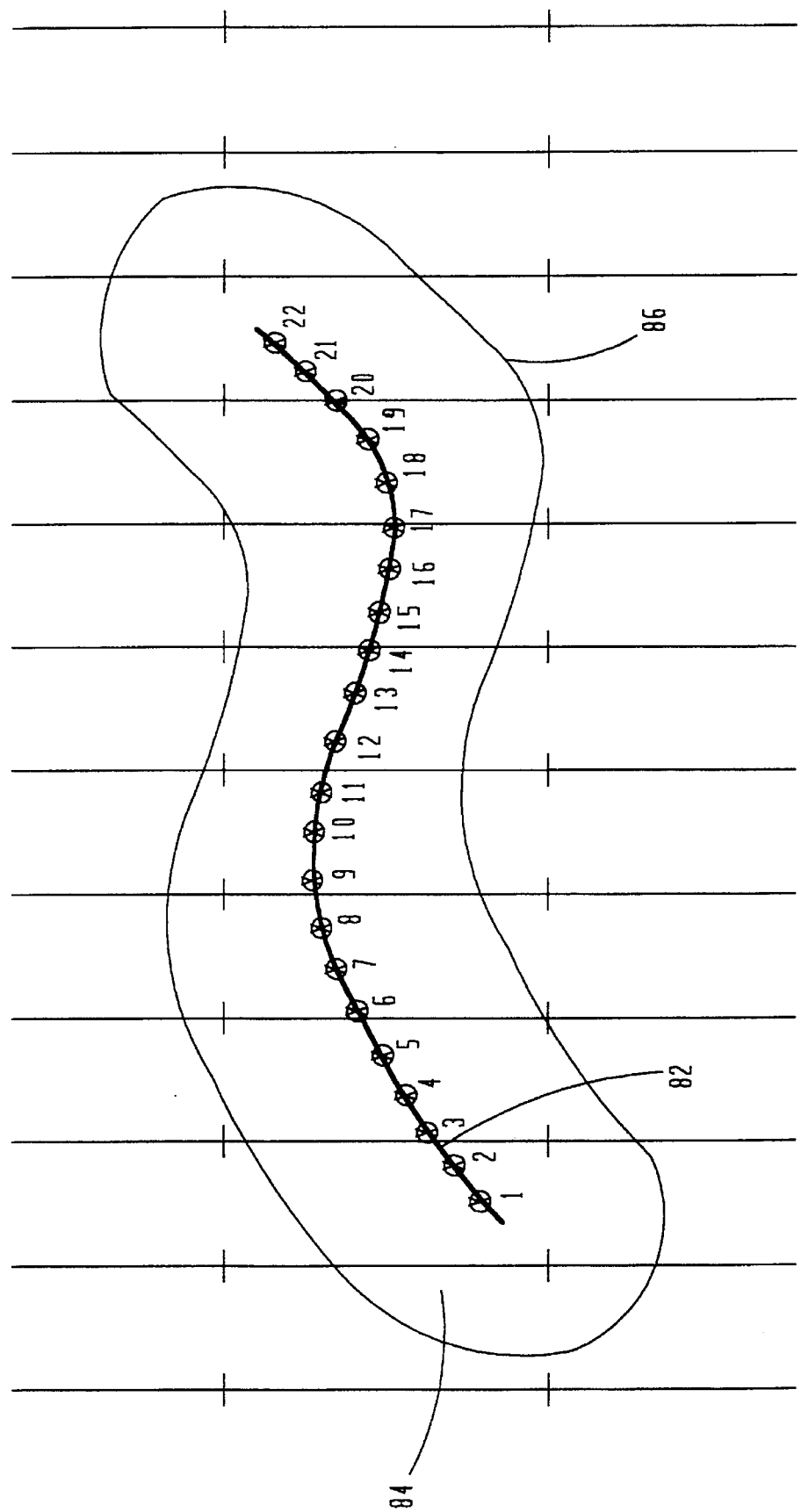
FIG. 6 illustrates the operation of the stride zone function as a display field of a graphical interface.

Referring back to FIG. 1, the stride zone function 80 indicates the maximum distance each position within a drill position may travel without exceeding a predetermined stride. By calculating the distance each individual within a formation may move, the boundary zone that the formation may move within can be calculated. FIG. 6 illustrates the display of a stride zone for a particular formation. From the formation 82, a new formation may be formed within the stride zone 84. Each individual position within the formation 82 is limited to its own particular stride region.

Referring also to FIG. 7, there is more fully illustrated the method for determining the stride zone 84. A boundary 86 encloses the stride zone 84 around the formation 82. The boundary 86 is generated by determining the perimeter around the formation 82 at a distance equivalent to the number of counts between the two anchors multiplied by the length of a marching step stride. The boundary 86 indicates the maximum possible distance that can be travelled between the counts indicated by the anchors on the count track. The number of pixels per step are determined at step 88. The number of pixels per step indicates the number of screen pixels per marching step at a given step stride such as eight steps per five yards. Next, the total number of counts in a transition are determined at step 90 by calculating the number of counts between the anchor points. The maximum stride region for each individual position in the formation 82 is calculated at step 92. The stride region comprises a circle around each position having a radius according to the equation:

$$\text{Stride Region} = \frac{\text{PIXPERSTEP} \times \text{Transition Counts}}{2}$$

where:

PIXPERSTEP=screen pixels per marching step at a given stride;

Transition Counts=total counts in a transition.

Finally, a union of the maximum stride regions is created at step 94 to determine the outer boundary 86 for the stride zone 84.

Referring again to FIG. 1, the drill rewrite module 16 enables a user to quickly resize any previously generated drill to reflect a differing number of position within the drill. Using this module, a new drill may be quickly constructed having a greater or lesser number of positions within the drill than the originally designed drill. The add position function 100 enables a user to increase the number of position within a drill formation. The delete position function 102 enables a user to resize a formation using a lesser number of positions.

Within the drill rewrite module, an indexing system is used wherein each position within a formation is identified by the parent formation and position rank in the formation. This is done in the form of indexes or links which identify each position according to their adjacent positions in the formation. The head of a formation is denoted with a negative index and the tail is denoted with a zero index. The indexing is unique for each count of a drill. However, due to the nature of drill design, the indexing is usually the same during transitions. This architecture makes position removal and insertion possible throughout a drill.

Figure 8:
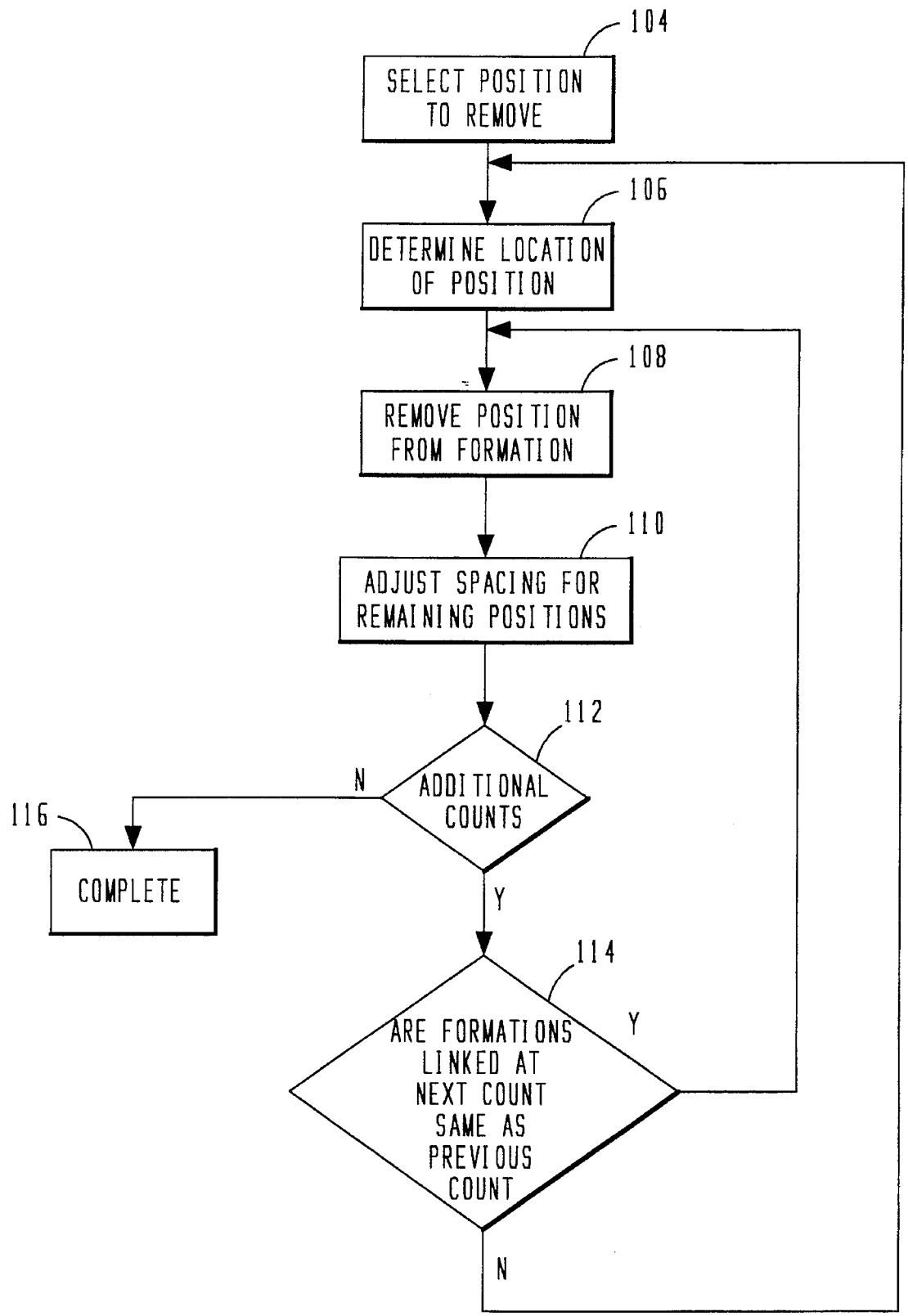
FIG. 8 is a flow chart illustrating the procedure for removing a position from a drill.

Referring now to FIG. 8, there is illustrated the method for removing a position from a formation. The user selects at step 104 a position to be removed from the formation. The location of the position within the formation is determined at step 106. The position is removed from the determined formation at step 108, and the spacing for the resized formation adjusted at step 110 to make the spacing equal for all of the remaining positions within the resized formation. When positions are removed, the delete position function 102 maintains path integrity between transition points and spacing transition within a formation. Inquiry step 112 determines if additional counts exist within the drill, and if so, step 114 determines if the formation at the next count is linked in a manner similar to the formation at the previous count. If the formations are linked in a similar manner, control passes to step 108 and the position is merely removed from the next formation as described above. If the linkage is different within the next formation, control passes back to step 106 and the location of the position within the next formation is determined. Once the position has been removed from all counts of a drill, the process is completed at step 116.

Figure 9:
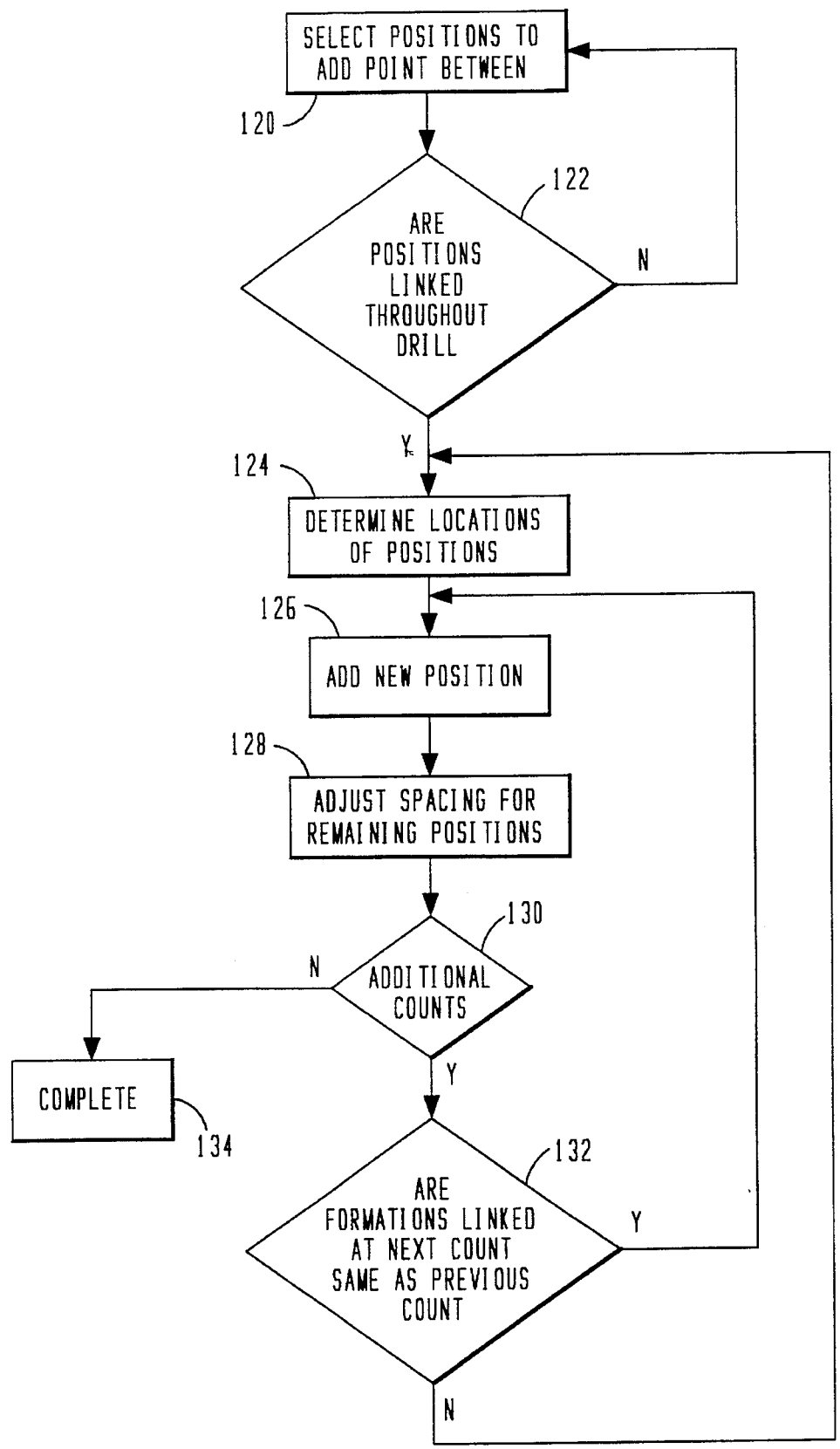
FIG. 9 is a flow chart illustrating the procedure for adding a new position to a drill.

Referring now to FIG. 9, there is illustrated the procedure for adding a position to a drill. The positions to add a position between are selected at step 120, and inquiry step 122 determines if these positions are linked throughout a drill. If the positions are linked throughout a drill, the initial formation location of the added position is determined at step 124, and the position is added to the formation at step 126. If the positions are not linked throughout the drill, control returns to step 120 for the selection of linked positions. The spacing for the remaining positions within the formation is adjusted at step 128 to accommodate for the added position. As discussed previously with respect to FIG. 8, the add position function 100 maintains path integrity for positions between transition points and adjust spacing of positions within a formation. If additional counts exist within the drill, inquiry step 130 passes control to step 132 wherein a determination is made if the formation of the next count are linked as in the previous count. If the formations are linked in a similar manner, control passes back to step 126 and the new position is added to the formation at the next count. If the positions are not similarly linked, control passes to step 124 to determine the location in the next formation where a position belongs. Once the position has been added to all counts within the drill, the process is completed at step 134.

Referring once more to FIG. 1, the editing operations module 18 divides editing operations into operating layers to simplify the editing of drill charts. Each layer contains editing tools that are specific to a particular layer. A user may select one of three layers to operate within: the shapes layer function 140, the symbols layer function 142, and the props layer function 144. The shapes layer function 140 contain tools for reshaping and editing entire formations. The symbols layer function 142 contains tools for editing individual positions within a formation by symbol, color, or label. Finally, the props layer function 144 contains tools for providing arrows editing pictures and adding text used to describe a drill formation upon the display field of the graphical interface.

The MIDI module 20 enables the input and processing of a MIDI file. The MIDI file may then be played along with a drill design on the display field and cause the drill illustrated on the display field to advance one count for each beat of music played from the MIDI file.

The triplicate mirror module 24 allows a user to select a point on the display field. The selected image surrounding the point will then be duplicated by creating an image that is rotated 100/3 degrees and 100/3 times 2 degrees around the point. This creates three mirrored images that are centered around the selected point and provide three different views of the formation about the selected point.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the spirit of the invention.

I claim:

1. A drill design aide for designing a drill having a plurality of positions comprising:

a graphical interface for generating a display of a drill being designed and providing access to a plurality of modules;

a drawing tool module for creating and editing the drill displayed by the graphical interface; and a count track module for editing a previously generated first drill formation to create a second drill formation and generating each formation occurring between the first drill formation and the second drill formation, said count track module including a stride zone function for determining the maximum area a formation may move within during a preselected number of counts.

2. A drill design aide for designing a drill having a plurality of positions, comprising:

a graphical interface for generating a display of the drill being designed and providing access to a plurality of modules;

a drawing tool module for creating and editing the drill displayed by the graphical interface;

a drill rewrite module for altering the number of positions contained within the drill; and a count track module for editing a previously generated first drill formation to create a subsequent second drill formation and generating each formation occurring between the first drill formation and the second drill formation, said count track module including a stride zone function for determining the maximum area a formation may move within during a preselected number of counts.

3. A method for generating a drill design, comprising the steps of:

setting a first anchor point at an initial count location;

generating a first drill formation at the first count location;

setting a second anchor point at a second count location;

determining a maximum stride zone for the first drill formation;

reshaping the first drill formation into a second drill formation; and calculating intervening drill formation between the first and second drill formations for each count between the first and second count locations.

4. A drill design aide for designing a drill having a plurality of positions comprising:

a graphical interface for generating a display of a drill being designed and providing access to a plurality of modules;

a drawing tool module for creating and editing the drill displayed by the graphical interface;

a count track module for editing a previously generated first drill formation to create a second drill formation and generating each formation occurring between the first drill formation and the second drill formation; and a stride zone function within the count track module for determining the maximum area a formation may move within during a preselected number of counts, said stride zone function including first means for determining a number of pixels per step, second means for determining a total number of counts between the first formation and the second formation, means responsive to the first and second means for determining a maximum stride region for each position in a formation, and means for combining the maximum stride regions for each position in the formation to generate a maximum stride zone for the formation.

5. A drill design aide for designing a drill having a plurality of positions comprising:

a graphical interface for generating a display of a drill being designed and providing access to a plurality of modules;

a drawing tool module for creating and editing the drill displayed by the graphical interface;

a count track module for editing a previously generated first drill formation to create a second drill formation and generating each formation occurring between the first drill formation and the second drill formation; and a triplicate mirror module function for providing multiple views of a drill from a selected point.

6. A drill design aide for designing a drill having a plurality of positions, comprising:

a graphical interface for generating a display of the drill being designed and providing access to a plurality of modules;

a drawing tool module for creating and editing the drill displayed by the graphical interface;

a drill rewrite module for altering the number of positions contained within the drill;

a count track module for editing a previously generated first drill formation to create a subsequent second drill formation and generating each formation occurring between the first drill formation and the second drill formation; and a stride zone function within the count track module for determining the maximum area a formation may move within during a preselected number of counts, said stride zone function including first means for determining a number of pixels per step, second means for determining a total number of counts between the first formation and the second formation, means responsive to the first and second means for determining a maximum stride region for each position in a formation and means for combining the maximum stride regions for each position in the formation to generate a maximum stride zone for the formation.

7. A drill design aide for designing a drill having a plurality of positions, comprising:

a graphical interface for generating a display of the drill being designed and providing access to a plurality of modules;

a drawing tool module for creating and editing the drill displayed by the graphical interface;

a drill rewrite module for altering the number of positions contained within the drill; and a triplicate mirror module function for providing multiple views of a drill from a selected point.

8. A method for generating a drill design, comprising the steps of:

setting a first anchor point at an initial count location;

generating a first drill formation having a plurality of positions at the first count location;

setting a second anchor point at a second count location;

determining a number of pixels per step;

determining a total number of counts between the first and second anchor points;

calculating a maximum stride region for each position in the first formation;

combining each of the maximum stride region for each of the positions to determine a maximum stride zone for the first formation;

reshaping the first drill formation into a second drill formation; and calculating intervening drill formation between the first and second drill formations for each count between the first and second count locations.

* * * * *